United States Patent [19]
Brand et al.

[11] Patent Number: 5,496,467
[45] Date of Patent: Mar. 5, 1996

[54] METHOD FOR THE CATALYTIC REFORMING OF NAPHTHA

[75] Inventors: Reinhold Brand, Hanau; Hans L. Rotgerink, Glattbach, both of Germany

[73] Assignee: Degussa Aktiengesellschaft, Frankfurt am Main, Germany

[21] Appl. No.: 413,878

[22] Filed: Mar. 20, 1995

Related U.S. Application Data

[63] Continuation-in-part of Ser. No. 160,869, Dec. 3, 1993, abandoned.

[30] Foreign Application Priority Data

Dec. 4, 1992 [DE] Germany .......................... 42 40 863.6

[51] Int. Cl.$^6$ .......................... C10G 35/09; C10G 35/095
[52] U.S. Cl. .......................................... 208/139; 208/138
[58] Field of Search ..................... 208/139, 137, 208/138, 140, 141; 585/476, 477, 482, 407

[56] References Cited

U.S. PATENT DOCUMENTS

| | | | |
|---|---|---|---|
| 3,943,050 | 3/1976 | Bertolacini et al. | 208/65 |
| 4,197,188 | 4/1980 | Antos | 208/139 |
| 4,791,087 | 12/1988 | Moser et al. | 502/227 |

FOREIGN PATENT DOCUMENTS

| | | |
|---|---|---|
| 0234837 | 10/1991 | European Pat. Off. . |
| 7220995 | 7/1974 | France . |
| 2455375 | 11/1973 | Germany . |
| 2731669 | 1/1978 | Germany . |
| 2639747 | 3/1978 | Germany . |
| 2920741 | 12/1979 | Germany . |
| 2615066 | 6/1982 | Germany . |

OTHER PUBLICATIONS

Kirk–Othmer, "Encyclopedia of Chemical Technology", 3rd Edition, vol. 4, S 264–277.
Kirk–Othmer, "Encyclopedia of Chemical Technology", vol. 9, 3rd Edition, pp. 707–709.
Catalytic Reforming, BTX Operation, Chapter 6, Donald Little, pp. 142–153.
Kirk–Othmer, Pure and Applied Chemistry, vol. 57, No. 4, pp. 603–619.

*Primary Examiner*—E. Rollins Cross
*Assistant Examiner*—Bekir L. Yildirim
*Attorney, Agent, or Firm*—Beveridge, DeGrandi, Weilacher & Young

[57] ABSTRACT

Catalytic reforming of $C_9+$ containing naphtha with a high yield of BTX is disclosed. Naphtha is converted under customary reforming conditions on a catalyst which contains at least one platinum group metal at least one metal of the group IV B, and at least one halogen component on an oxidic carrier.

10 Claims, 5 Drawing Sheets

METHOD FOR THE CATALYTIC REFORMING OF NAPHTHA

REFERENCE TO A RELATED APPLICATION

This is a continuation-in-part of our application number 08/160,869 filed Dec. 3, 1993, now abandoned, which is relied on and incorporated herein by reference.

INTRODUCTION AND BACKGROUND

The present invention relates to a method for the catalytic reforming of naphtha with a high yield of BTX aromatics. More particularly, the present invention relates to a method whereby a high yield of BTX aromatics is obtained from a full-boiling-range naphtha feed stock without the need for any pretreatment steps such as splitting the naphtha into a low boiling and a high boiling stream. The catalytic reforming of naphtha is an important refining process in the petroleum refining industry with the goal of producing the following substances:

1. High-octane hydrocarbons for the gasoline pool or
2. BTX-aromatic compounds (benzene, toluene, xylene) as important chemical raw materials or solvents.

In the known process of catalytic reforming, naphtha is reacted on a catalyst at temperatures between 300° and 600° C. under hydrogen gas at pressures of 1 to 50 bars. Under these conditions, different reactions occur in parallel to each other such as isomerization, dealkylation, dehydrocyclization, dehydrogenation, hydrocracking and hydrogenolysis. Which processes predominate is a function of the reaction conditions, of the composition of the particular naphtha stream and of the catalyst.

Gasoline represents a mixture of many hydrocarbons. An octane number can be associated with each hydrocarbon. A high octane number is desired in gasoline for use as fuel for internal combustion (Otto) engines. High-octane hydrocarbons are isoparaffins and aromatics.

The proportion of aromatics and especially of benzene in gasoline has been constantly reduced in recent years on account of their toxicity in order to meet environmental requirements. It can be expected that the permitted aromatics content in gasoline will be further reduced in the coming years.

On the other hand, BTX aromatics are important raw materials for the chemical industry. For example, styrene based plastics, phenolic polymers, nylon and biologically degradable detergents are produced from benzene. Toluene is used as a solvent in dyes; ortho- and para-xylene are processed to polyester fibers, plastic foils and plastic bottles. Metaxylol is normally isomerized catalytically to para-xylene. Thus, reforming processes with the highest possible yields of BTX aromatics are desired for these applications. Various extraction methods are known for separating the BTX aromatics from the non-converted aliphatic hydrocarbons; see for example, Kirk-Othmer "Encyclopedia of Chemical Technology"; 3rd edition, vol. 9, pp. 707–709.

Catalytic reforming is carried out in various system types. All methods comprise several series-connected reactors in which the catalyst is located. In the so-called semi-regenerative and cyclic systems the catalyst is built into the reactors in the form of a fixed bed. In the modern CCR systems (CCR: "Continuous Catalyst Regeneration") the catalyst, consisting of small spheres, flows slowly through the reactors and is discharged after a certain dwell time (2 to 7 days).

The catalyst is slowly covered during the operation with residues (coke) containing carbon. This brings about a noticeable deactivation.

The deactivation speed is a function of the type of naphtha used, the process conditions and the catalyst. After a certain coke content is deposited on the catalyst it is no longer profitable to continue to use the catalyst. It must be regenerated in order to restore the activity. In semi-regenerative and in cyclic systems the regeneration is carried out in the reactor and in a CCR system this takes place externally. After regeneration the catalyst is subsequently reintroduced into the reactor. The frequency of regeneration in the CCR method is distinctly higher in comparison to the two other methods.

The state of the art in the area of catalytic reforming has achieved a high level in the meantime as a result of years of research activities. Due to the large amounts of naphtha which are to be matched to their later usage by means of reforming processes, even rather small advances in this art constitute a large economic advantage.

Catalytic reforming has been carried out since the 70's with preference being given to the use of bimetallic catalysts. The catalysts generally contain a platinum group metal (preferably platinum) and a second metal (usually designated as a promotor) which improves the catalytic qualities of the catalyst. Aluminum oxide is used as catalyst carrier. Furthermore, a halogen component is present, usually chlorine.

Rhenium is frequently used as the second metal of the catalyst. Platinum-rhenium catalysts are distinguished by a very good stability.

In recent years Pt—Sn catalysts have been increasingly used. They yield a distinctly higher liquid yield than the Pt—Re catalysts at the same octane number. The lower stability of the Pt—Sn catalysts in comparison to Pt—Re catalysts must be compensated for by a higher frequency of regeneration. Pt—Sn catalysts are therefore preferably used in CCR systems since in these systems the time between two successive regenerations is relatively short in comparison to other systems. The more stable Pt—Re catalysts are preferably used in semi-regenerative and cyclic systems as fixed-bed catalysts.

The boiling range of the naphtha to be reformed plays an important part in the optimizing of the BTX yield. The precursors of benzene have a boiling point between 71° and 82° C. and the toluene precursors between 82° and 121° C. (D. M. Little in "Catalytic Reforming", Penn Well Publishing Company, 1985, chapter 6). The xylene precursors ($C_8$) boil between 106° and 130° C.

On the other hand, fractions of naphtha with a boiling range between 65° and 175° C. or between 71° and 171° C. are used in the production of BTX aromatics. Even more narrow boiling ranges are used such as e.g. 84° to 157° C. In every instance naphtha with these boiling ranges also always contains $C_{9+}$ hydrocarbons, since the boiling ranges of $C_8$ hydrocarbons and of $C_{9+}$ hydrocarbons overlap to a large extent (Kirk-Othmer "Encyclopedia for Chemical Technology"; 3rd edition, vol. 4, pp. 264–277). The reformate of these naphtha fractions therefore generally contains considerable amounts of $C_{9+}$ aromatics in addition to the BTX aromatics.

Elevated yields of BTX aromatics can be achieved by means of engineering measures. European patent EP 0,234,837 describes a reforming method for a high-boiling naphtha fraction (boiling range 118° to 198° C.) with which elevated BTX yields can be achieved using two different catalysts in two zones. A Pt—Sn catalyst is used in the first zone and in the second zone a platinum catalyst which can additionally contain Re. Since two catalysts must be used in this patent this method can not be used in the CCR systems corresponding to the newest state of the art, which generally contain only one regeneration system.

U.S. Pat. No. 3,943,050 also describes a 2-stage method for reforming naphtha fractions of the gasoline boiling range of approximately 50° to 215° C. for the production of high-octane blended components for motor fuels. A catalyst without zirconium is used in the first stage. A zirconium-containing catalyst is used in the second stage. The reformate formed is characterized by octane number only as regards its use in gasoline. The patent furnishes no indications about the level of BTX amounts in the reformate.

German patent DE 29 20 741 describes a method for depositing zirconium on an oxidic carrier. In that process, zirconium is deposited onto the carrier from a zirconium-containing solution containing at least one zirconium complex ion which is formed from an organic acid, preferably oxalic acid. Correspondingly formed catalysts (which also contain Cl, Pt and Sn in addition to Zr) are used in the examples in the isomerization of $C_8$ aromatics, of paraffins and in the reforming of n-heptane. An elevated yield of BTX aromatics was not established.

A catalyst is described in German patent DE 24 55 375 which contains at least one of the metals zirconium, titanium or tungsten in addition to a platinum group metal and tin and which is used in the reforming of hydrocarbons. In the aromatization of $C_6$ to $C_7$ hydrocarbon mixtures with a Pt—Sn—Zr catalyst the selectivity as regards the aromatics is between 45.8 and 53.8%, depending on the composition of the feed.

U.S. Pat. No. 4,197,188 describes catalysts which contain rhenium in addition to a platinum group metal and zirconium. French patent 2,187,885 describes a reforming catalyst containing at least one of the lanthanide metals in addition to aluminum oxide, platinum and zirconium. The reformate obtained is characterized by octane number only as regards its application for gasoline. No individual substances (such as e.g. benzene, toluene or xylene) are considered.

In addition to the above-mentioned applications for reforming, Zr-containing catalysts are used in isomerization (e.g. DE 26 39 747, DE 26 15 066 and DE 27 31 669).

Prior art methods have also included splitting the naphtha feed into a low boiling fraction and a high boiling fraction; see U.S. Pat. No. 4,401,554.

SUMMARY OF THE INVENTION

It is an object of the present invention to provide a method for the catalytic reforming of naphtha with only one catalyst and without the need to split the feed stock into separate streams which is distinguished by an elevated yield of BTX aromatics and can therefore be used with advantage in producing intermediate chemicals for the chemical industry.

In achieving the above and other objects, one feature of the present invention resides in a method for the catalytic reforming of naphtha to obtain a high yield of BTX aromatics, by catalytic conversion of naphtha under customary reforming conditions wherein only one catalyst is present; namely one which contains at least one platinum group metal, at least one metal of the group IVB, and at least one or more halogen compounds on the formed oxidic catalyst carrier. Typically an aluminum oxide from the transition series of the crystallographic phases is used as the catalyst carrier. No multiple different catalysts are used in this invention.

According to a more detailed aspect of the invention, the catalyst contains 0.05 to 2% by weight platinum, 0.05 to 5% by weight zirconium and 0.5 to 1.5% by weight chlorine, relative in each instance to the total weight of the catalyst material.

In a still further detailed aspect of the invention there is present in the catalytic reforming of naphtha as the sole catalyst a catalytic composite of a carrier such as aluminum oxide impregnated with at least one platinum group metal which is platinum, and at least one metal of the group IVB which is zirconium. In addition, there is present at least one halogen component, preferably chlorine, on a formed oxidic carrier.

Customary reforming methods operate at reactor temperatures of 300 to 600, preferably 460° to 540° C. and hydrogen pressures of 1 to 50 or preferably 3–25 bars. A fully boiling range naphtha is converted in the reactor with a space velocity WHSV (Weight Hourly Space Velocity; grams naphtha per hour per grams catalyst), of 0.5 to 10, typically 1.0 to 3.0 $h^{-1}$. In addition, the molar ratio of hydrogen to naphtha is adjusted to values between 1 to 15, especially 2 to 10. The naphtha feed stock is not fractionated or split prior to the catalytic reforming step.

As will be apparent from the detailed description of the invention, an important feature of the present invention resides in carrying out the catalytic reforming with a full boiling range naphtha without splitting into fractions.

DETAILED DESCRIPTION OF INVENTION

Figure 1:
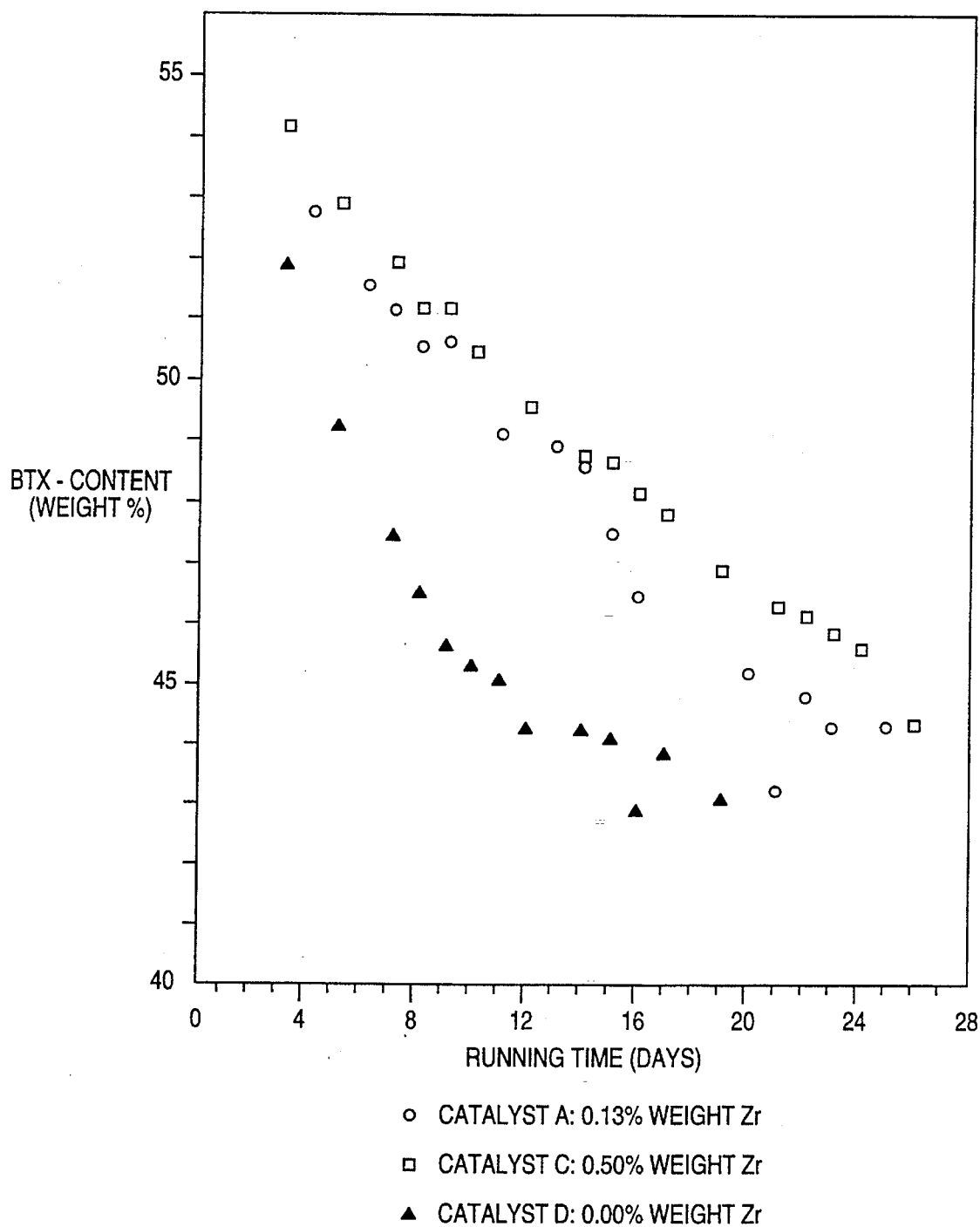
FIG. 1 shows the BTX content in the reformate when using Pt—Zr catalysts in accordance with the invention in comparison to using a Pt—Sn catalyst as a function of the running time of the reforming process.

The oxidic carrier suitable for use in accordance with the present invention contains a porous material with a large surface area such as, for example, the various aluminum oxides from the transition series of the crystallographic phases or aluminum silicates, which are all well known in the art for use as catalyst carriers. Carriers are used which preferably contain gamma or eta aluminum oxide as essential component and exhibit a specific surface area according to BET (DIN 66132) between 100 and 600 $m^2/g$ as well as a pore volume of 0.3 to 1.0 ml/g composed primarily of meso and macropores with pore radii between 1 and 25 nm respectively above 25 nm (according to a division according to IUPAC; Pure & Appl. Chem., 57 (1985), 603–619).

The carriers can be produced from a sol according to the oil droplet method, or from a powder by means of structural agglomeration or by extrusion. The carriers are preferably spherical with diameters in a range of 0.5 to 3.0 mm. The active components of the catalyst are introduced into the carrier by means of impregnation with aqueous solutions of suitable precursor compounds. Spray or immersion impregnations are equally suited for this purpose.

The addition of an inorganic acid, e.g. hydrochloric acid, to the impregnating solution achieves a homogeneous impregnation of the active components across the entire cross section of the carriers.

Especially high yields of BTX aromatics are attained if platinum is used as the platinum group metal, zirconium as the promoter and chlorine as halogen. Preferred platinum compounds for the production of the catalyst are those with which the chlorine component can be introduced at the same time such as e.g. hexachloroplatinic acid, ammonium hexachloroplatinate, diammindichloroplatinum(II) and diammintetrachloroplatinum(IV) as well as platinum(II) chloride and platinum(IV) chloride. Even chlorine-free platinum compounds can be used. Suitable zirconium compounds are zirconyl nitrate, zirconyl acetate, zirconyl chloride and zirconium chloride or other water-soluble zirconium compounds.

The platinum group metal and the promoter can be impregnated either from a common solution or from separate solutions and the sequence of the impregnations plays no role. After the impregnation the catalytic precursors obtained are dried and optionally calcined and subsequently reduced and activated at temperatures of 300° to 600° C. under a current of gas containing hydrogen.

The finished catalyst contains preferably 0.5 to 2% by weight platinum, 0.05 to 5% by weight zirconium and 0.5 to 1.5% by weight chlorine relative in each instance to the total weight of the catalyst.

It is essential for the invention that a full boiling range naphtha containing $C_{9+}$ is used as the feed. [as is also customarily the case in the industry]. It can be observed when using the catalyst in accordance with the invention that the content of BTX aromatics increases in the reformate and the content of $C_{9+}$ hydrocarbons decreases. This reduces the expense for separating the BTX aromatics from the reformate.

The following examples serve to illustrate the invention.

EXAMPLES

The method of the invention was tested in a conventional fixed-bed reactor. 15.0 g catalyst was introduced into the reactor. The remaining reactor volume was filled up with inert particles. The reactor was located in a salt bath which was continuously agitated. This assured an isothermal operation of the catalyst.

The catalyst was heated up to 500° C. under a current of $N_2$ gas. Then, $N_2$ was replaced with $H_2$ and the pressure was raised to 10 bars. The $H_2$ throughput was adjusted to 17.5 Nl/h (STP, standard pressure and temperature).

After a period of 1 hour, naphtha was charged. Both the $H_2$ and the naphtha were dried by being conducted over a conventional molecular sieve with a pore width of 0.5 nm as is known in the art. In addition, the naphtha was kept under argon gas in order to minimize the water induced loss of chlorine during the reforming and to assure that the chlorine content of the catalyst was in the optimal range between 0.7 and 1.0% by weight during the reforming process.

The gases leaving the reactor were cooled in order to condense the $C_{5+}$ hydrocarbons. The content of BTX aromatics in the liquid product was determined. The liquid yield $A_{liquid}$ and the BTX yield $A_{BTX}$ were calculated from the measured masses of the liquid product $M_{liquid}$ and of the BTX $M_{BTX}$ using the mass of the naphtha $M_{naphtha}$ fed to the reactor according to the following relationships as characteristic quantities for the reforming method:

$$A_{liquid}=(M_{liquid}/M_{naphtha}) \bullet 100\%$$

$$A_{BTX}=(M_{BTX}/M_{naphtha}) \bullet 100\%.$$

The naphtha used was a "full-boiling-range" naphtha with a boiling range between 50° and 190° C. as is readily understood in the art. The sulfur content was less than 1 ppm.

The conditions under which the naphtha was reformed are given in table 1:

TABLE 1

| | |
|---|---|
| Catalyst weight: | 15.0 g |
| Temperature: | 500° C. |
| Pressure: | 10 bars |
| $H_2$ throughput: | 17.5 l/h (20° C., 1 bar) |
| Naphtha throughput: | 22.5 g/h |
| WHSV*): | 1.5 $h^{-1}$ |
| $H_2$/naphtha ratio: | 4/1 mole/mole |

*): Weight hourly space velocity {g naphtha/ (h • g catalyst)}

Preparation of Catalyst

The catalytic carrier in spherical form with diameters in a range between 1.7 and 2.3 mm consisted of gamma aluminum oxide. The material had a BET surface of 185 $m^2/g$ and a pore volume of 0.60 ml/g. 300 g of the carrier were placed into a rotating container and sprayed with 180 ml of a HCl solution containing Zr.

This solution was produced by adding 1.33 g $ZrOCl_2 \bullet 8H_2O$ to 180 ml of an aqueous 2.5 molar HCl solution. The spraying process lasted 30 min. After a one-hour waiting period the moist pellets were dried in a fluidized bed for 30 min. at 120° C. A one-hour calcination then took place in air at 500° C.

A solution of 3.0 g $H_2PtCl_6$ (40% by weight Pt) in 180 ml 1.0 molar HCl was sprayed onto the catalyst precursor. After subsequent drying and calcination (conditions as above), the catalyst was reduced for 4 hours at 500° C. with a gaseous mixture consisting of 5% by volume $H_2$ and 95% by volume $N_2$. This catalyst is designated in the following as catalyst A. The finished catalyst A contained 0.40% by weight Pt and 0.13% by weight Zr.

Catalysts B and C were produced exactly as catalyst A. Only the amount of the zirconyl chloride ($ZrOCl_2$) used was changed. In addition to platinum and chlorine, catalyst B contained 0.25% by weight Zr, catalyst C contained 0.50% by weight Zr. Catalyst D was produced for purposes of comparison; with $ZrOCl_2$ being replaced with $SnCl_2$. Catalyst D contained 0.40% by weight Pt and 0.25% by weight Sn.

The chlorine content of catalysts A to D was between 0.9 and 1.1% by weight.

EXAMPLE 1

Reforming methods were compared with each other in this example using catalysts A, C and D. All three catalysts were tested as described above in exactly the same manner with naphtha from the same drum.

The composition of the naphtha is listed in table 2.

TABLE 2

| Naphtha composition | | | |
|---|---|---|---|
| % by weight | | % by weight | |
| $C_5$ | 0.3 | $C_8$ | 36.7 |
| $C_6$ | 8.3 | $C_9$ | 19.2 |
| $C_7$ | 26.8 | $C_{10+}$ | 8.7 |

Figure 2:
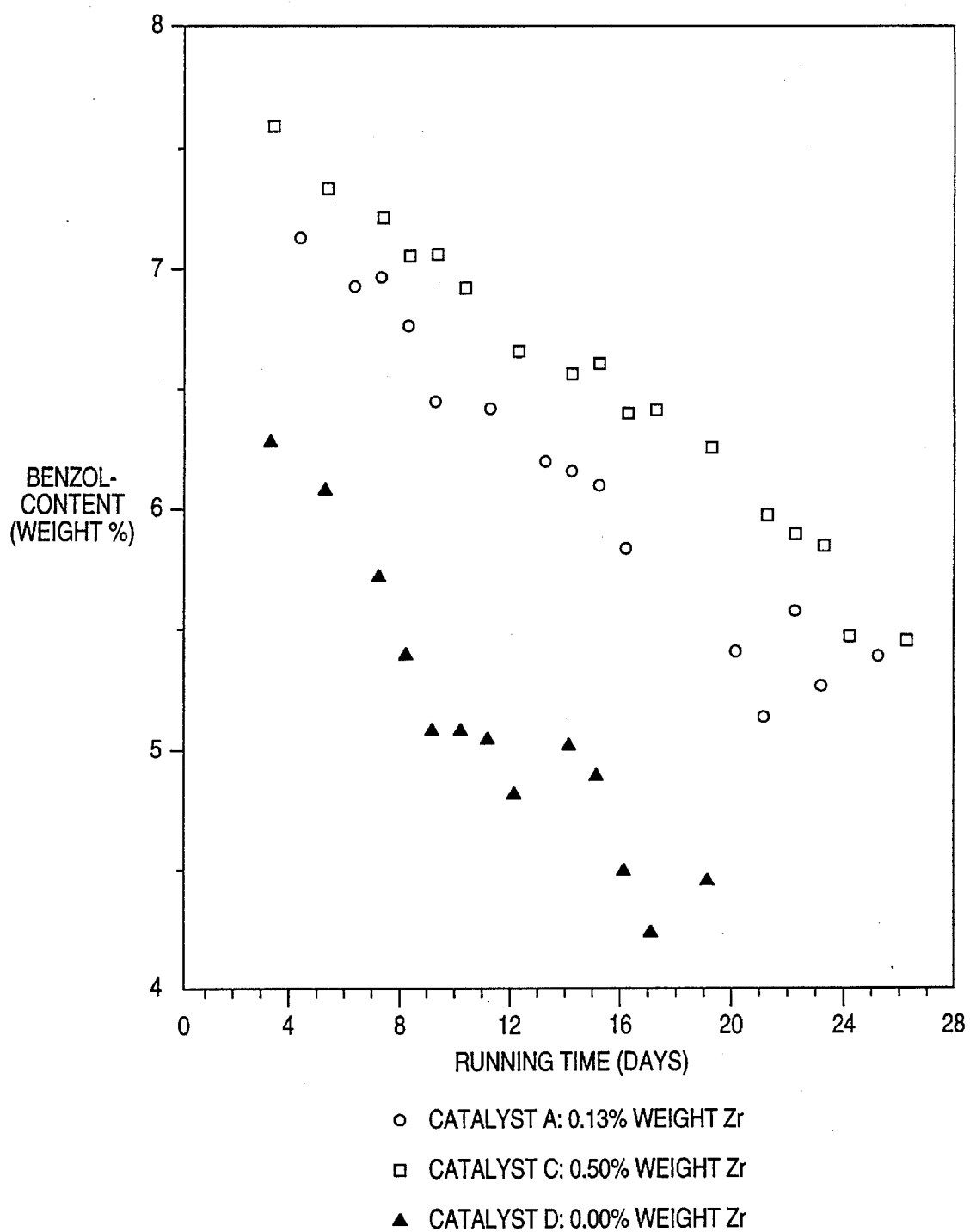
FIG. 2 shows the benzene content in the reformate of FIG. 1.
Figure 3:
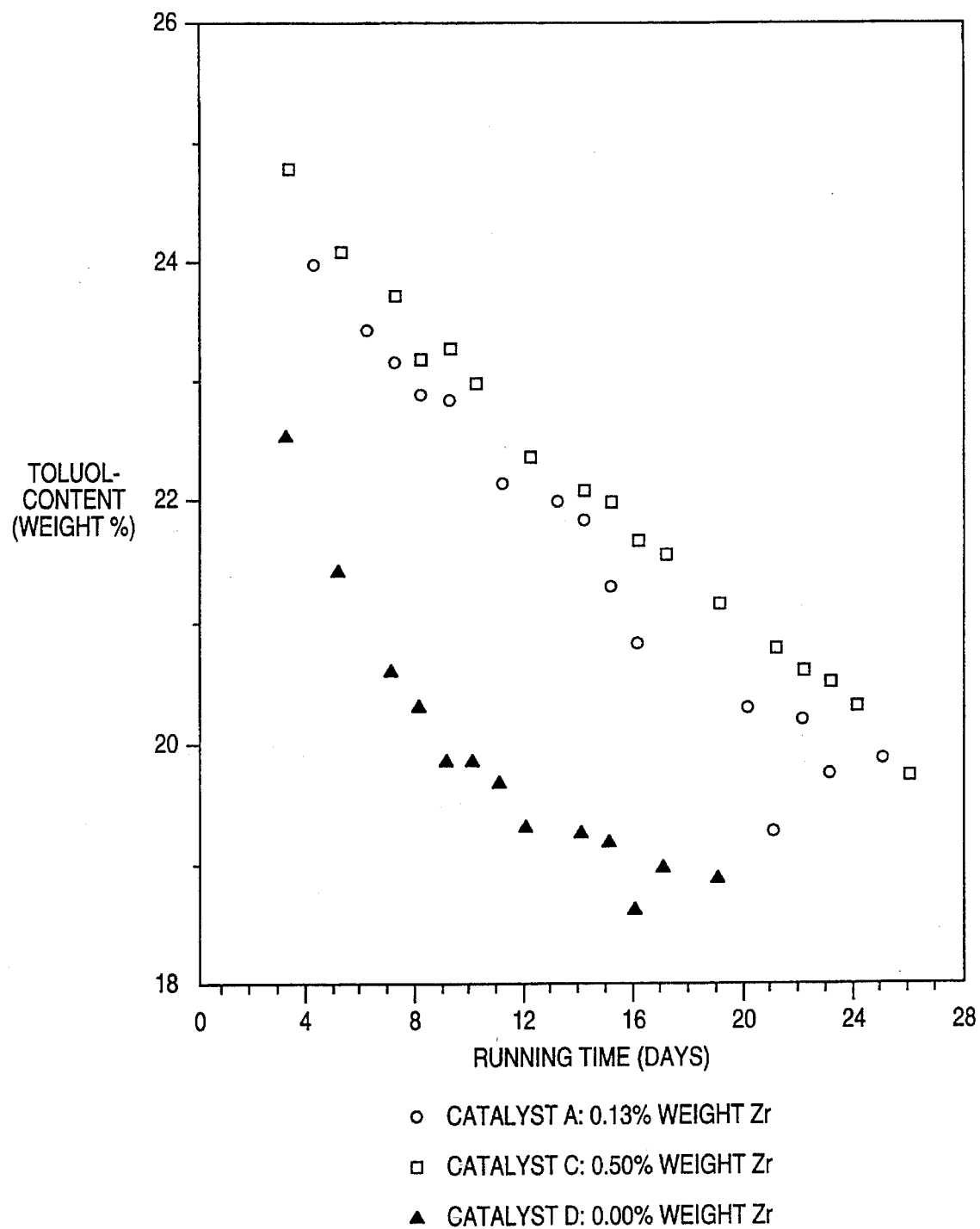
FIG. 3 shows the toluene content in the reformate of FIG. 1.
Figure 4:
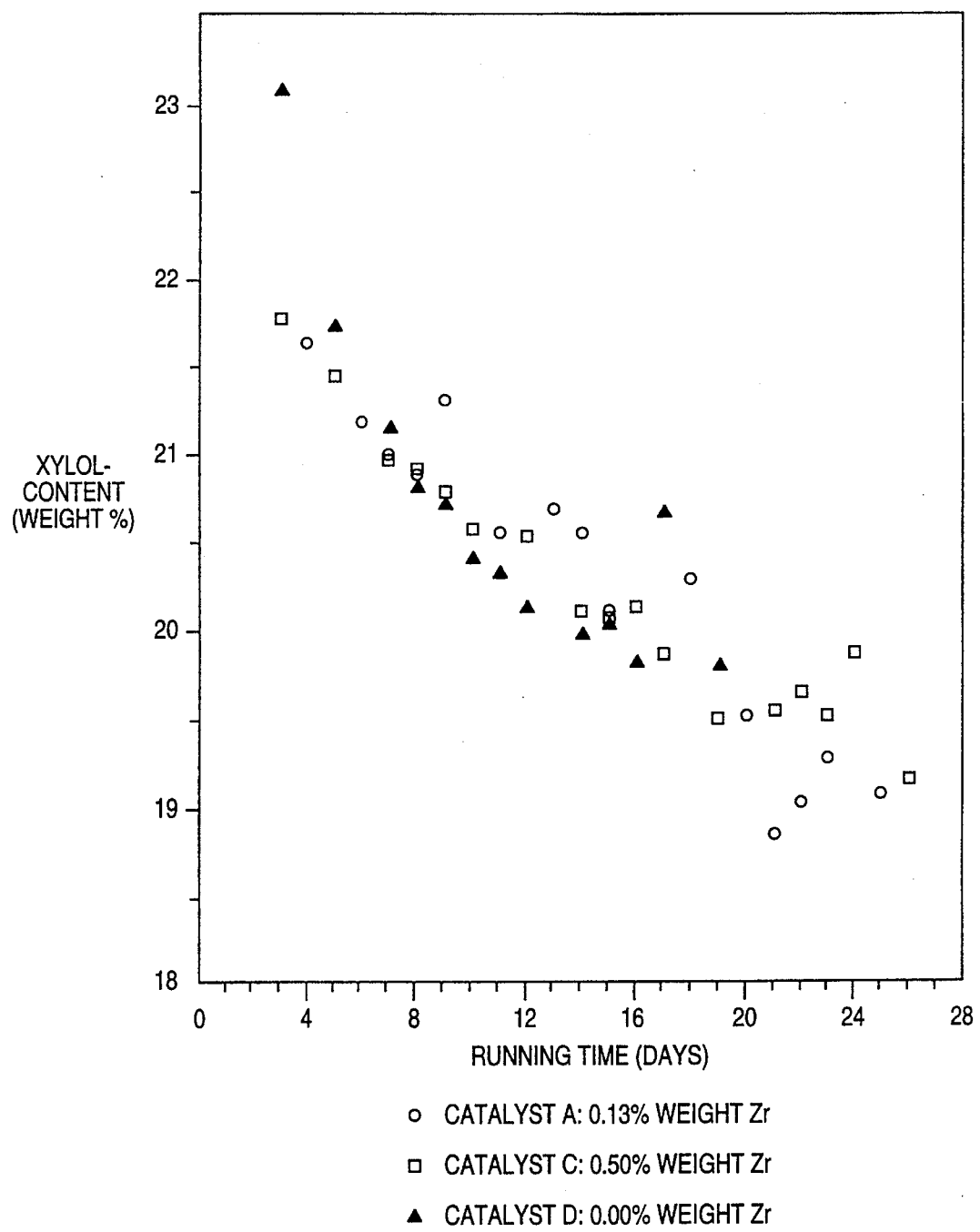
FIG. 4 shows the xylene content in the reformate of FIG. 1.
Figure 5:
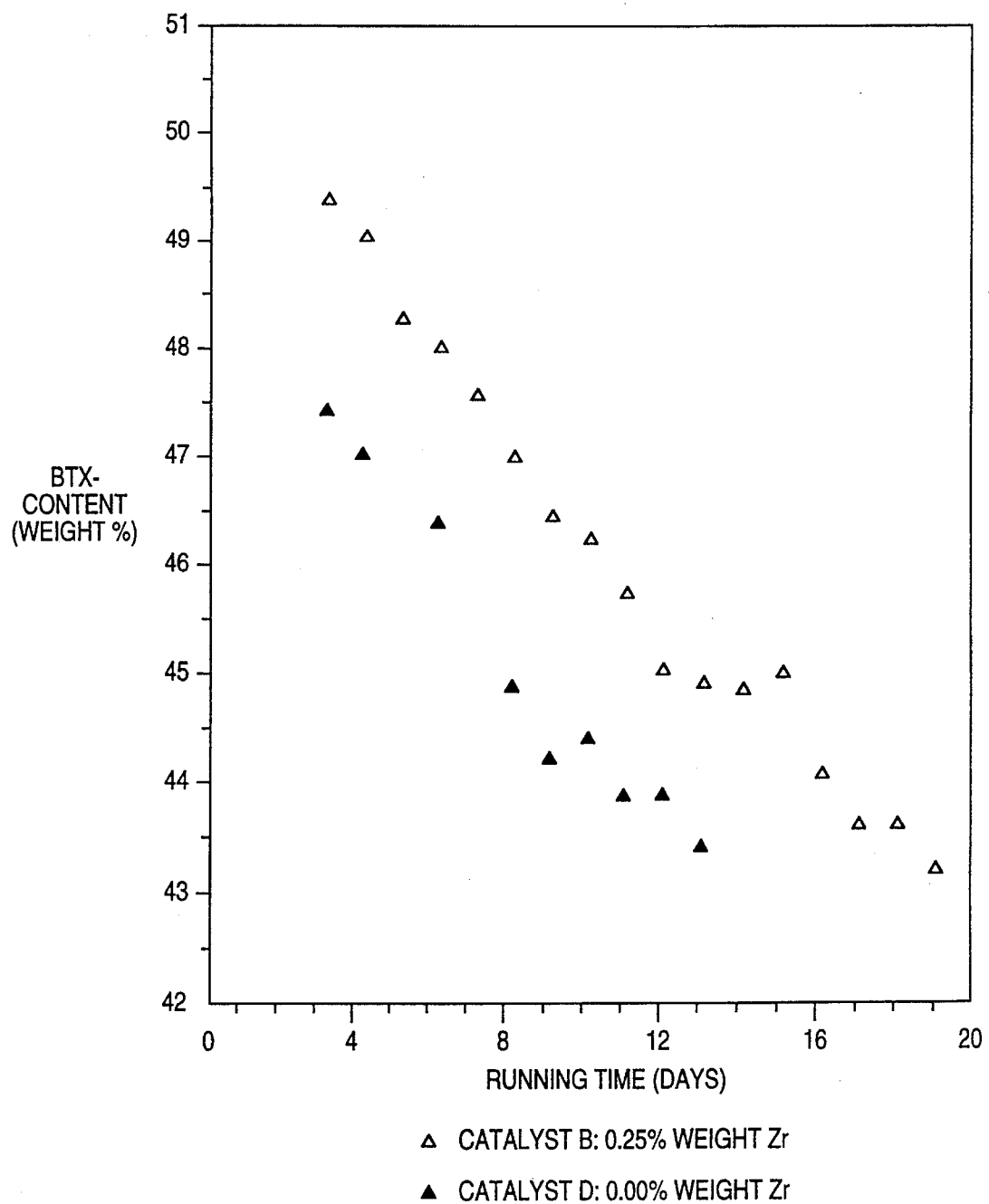
FIG. 5 shows the BTX content in the reformate when using a Pt—Zr catalyst in accordance with the invention in comparison to using a Pt—Sn catalyst as a function of the run time of the reforming process.

FIG. 1 shows the BTX content of the liquid product as a function of the running time. As is apparent therefrom, the BTX content obtained with catalysts A and C (in accordance with the invention) is distinctly higher than that obtained with catalyst D. As is apparent from FIGS. 2 to 4, this is primarily due to an increase of the benzene content and toluene content. The xylene content is identical for the three catalysts tested.

The liquid yield is somewhat less for catalysts A and C than for reference catalyst D. However, the total BTX yield is distinctly higher for catalysts than for reference catalyst (see table 3):

TABLE 3

BTX yields with catalysts A, C and D (Pt content 0.4 % by weight in each instance)

| Cat. | % by weight Zr | % by weight Sn | Average BTX Content (% by Weight) | Average Liquid Yield (% by Weight) | Average BTX Yield (% by Weight) |
|---|---|---|---|---|---|
| A | 0.13 | — | 50.8 | 78.5 | 39.9 |
| C | 0.50 | — | 51.2 | 78.5 | 40.2 |
| D | — | 0.25 | 46.4 | 82.4 | 38.2 |

It is thus clear that the liquid product with catalysts A and C to be used in accordance with the invention exhibits a distinctly higher BTX content and that even the BTX yields are distinctly higher than when catalyst D is used.

The higher BTX yields constitute a significant economic advantage in large-scale use of the method of the invention. In addition, the distinctly higher BTX contents in the liquid product reduce the expense for the extraction of the BTX aromatics.

When catalyst D was used the amount of $C_{9+}$ aromatics in the reformate was approximately 28.6% by weight but in the case of catalysts A and C only approximately 24.5 and 23.7% by weight. Thus, the amount of $C_{9+}$ aromatics in the reformate is reduced in favor of the desired BTX aromatics in the method of the invention.

Further modifications and variations will be apparent to those skilled in the art and are intended to be encompassed by the claims. German priority document P 42 40 863.6 is relied on and incorporated by reference.

We claim:

1. A method for the catalytic reforming of naphtha with a high yield of BTX aromatics, comprising, without any partial reformation or fractionation catalytically converting a full boiling range feed stock $C_9+$ containing naphtha under reforming conditions in the presence of a catalyst which contains at least one platinum group metal which is platinum, at least one metal of the group IVB which is zirconium and at least one halogen component which is chlorine on an oxidic carrier, said catalyst being the sole catalyst used for converting naphtha.

2. The method according to claim 1 wherein the carrier material is an aluminum oxide from the transition series of the crystallographic phases on which 0.05 to 2% by weight platinum, 0.05 to 5% by weight zirconium and 0.5 to 1.5% by weight chlorine, relative in each instance to the weight of the catalyst material, are present.

3. The method according to claim 1 wherein the oxide carrier contains gamma or eta aluminum oxides.

4. The method according to claim 1 wherein said oxide carrier consists of spherical particles.

5. The method according to claim 1 wherein said carrier has the catalytic components homogeneously impregnated across the entire cross section of said carrier.

6. The method according to claim 4 wherein said aluminum oxide has a BET surface area of 100 to 600 $m^2/g$.

7. The method according to claim 5 wherein said aluminum oxide has a pore volume of 0.3 to 1.0 ml/g.

8. The method according to claim 1 wherein the catalyst is present in a fixed bed in a CCR system.

9. The method according to claim 1 wherein the naphtha has a boiling range between 50° to 190° C.

10. The method according to claim 1 wherein said catalyst is free of tin.

* * * * *